July 14, 1959     D. JOHNSTAD     2,894,583
HONEYCOMB CUTTER
Filed Sept. 15, 1958

*INVENTOR:*
DAGFIN JOHNSTAD
BY
ATT'YS

United States Patent Office 2,894,583
Patented July 14, 1959

2,894,583

HONEYCOMB CUTTER

Dagfin Johnstad, Libertyville, Ill., assignor to Onsrud Cutter Manufacturing Company, Libertyville, Ill., a corporation of Illinois Application September 15, 1958, Serial No. 761,193

14 Claims. (Cl. 164—70)

This invention relates to an improved end mounted rotary cutting tool for working non-ferrous materials, especially of a honeycomb structure where it is essential to cut through spaced members without burring, burning, or deforming; and in particular, it relates to a cutting tool having a detachable, ring-like carbide cutting element which can be readily removed from the tool for sharpening or replacement purposes.

Prior to this invention single element, annular, end mounted rotary carbide cutting blades have been in the form of solid disks, welded or brazed to a shank, or bolted directly through the body of the blade to the shank of the tool. When brazed or welded such blades were not readily removable from the tool, and when bolted such blades were structurally weakened and ordinarily were not suited to end milling operations.

The main objects of this invention are to provide an improved cutting tool having a removable cutting blade in the form of a peripherally sharpened ring which is of minimum size and weight, thereby reducing costs by using a smaller amount of expensive cutting blade material; to provide an annular cutting blade which is easily detachable, so that the blades made of different materials can be used on the same tool; to provide such a cutting tool wherein there is only the blade ring to remove and grind for sharpening, and loss of tool operating time is reduced; to provide a milling tool having a readily removable ring-like cutting blade and which has no projections extending axially forward of the cutting face so that an end milling type of surface cutting operation may be performed; and to provide such a cutting blade having an interlocking means between the mounting member and the body of the cutting blade, so that if the blade should be broken during high speed operation, the blade segments will not fly apart.

Additional objects and advantages of the invention will become apparent as the specification proceeds.

A specific embodiment of this invention is illustrated in the accompanying drawings in which.

Figure 1:
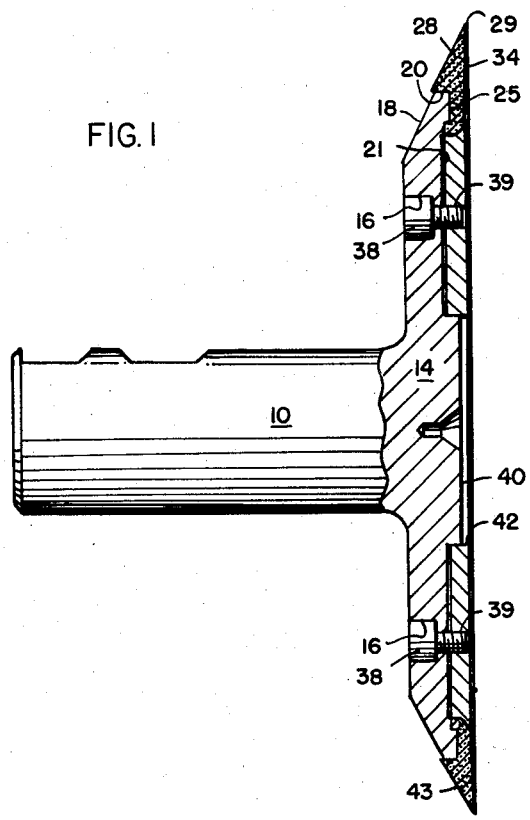
Figure 1 shows a sectional elevation of the improved cutter.
Figure 2:
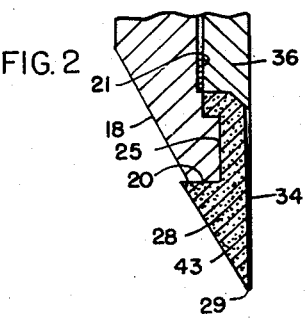
Fig. 2 shows a fragmentary sectional view of the cutting edge of the cutter.
Figure 3:
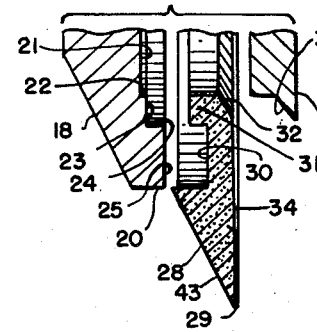
Fig. 3 is an exploded view of the parts shown in Fig. 2.
Figure 4:
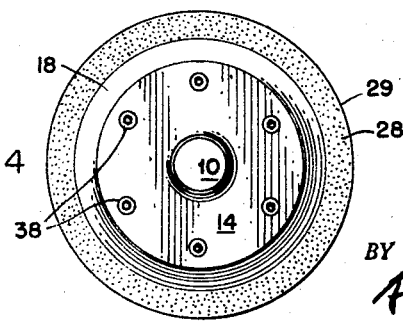
Fig. 4 is a rear view of the cutter assembly.

As shown, the improved tool comprises a shank 10 integrally formed with an annular plate-like end-flange 14 which is concentric with the shank axis and at right angles to it. Countersunk on the rear or shank side of the flange are six holes 16, uniformly spaced angularly about the shank axis, for six mounting screws; and on the same side the flange margin tapers radially and forwardly, as at 18, towards a relatively thin peripheral edge 20 which is squared parallel with the shank axis.

On the forward side or face the flange 14 has a broad annular recess 21, at the outer periphery of which a small axially concentric inwardly facing shoulder 22 is defined by a radial step 23 spaced axially forward from the bottom of the recess 21.

The outer periphery of the step 23 is defined by a second and larger shoulder 24, and a relatively wide land 25 extends from the shoulder 24 to the periphery 20 of the flange in a plane at right angles to the axis of the shank 10 and forwardly spaced from the step 23. The land 25 is preferably several times the width of the step 23 and forms a forwardly projecting radially flat mounting surface for the annular cutting ring 28 which the flange is intended to carry.

As shown in the drawings, the shoulders 22 and 24 are axially parallel and the step 23 and land 25 lie in parallel planes normal to the axis of the shank 10. Thus, the forward face of the flange 14 has a somewhat dished appearance and since the shoulders 22 and 24 are formed concentric with the shank axis the margin or land 25 of the flange provides a concentric rim for mounting the cutter blade 28.

The cutter blade is preferably made of tungsten carbide, or any other suitable hard material of sufficient strength and edge holding character, such as "Carbaloid 883" or "Kennametal K–8," and, in the form shown, is a radial ring tapering outwardly, from about midway of its width, to a sharp peripheral edge 29 which defines the forwardmost plane of the cutter face. This ring 28 is of greater outside diameter than the flange 14 and on its rearward side is formed with an annular groove or channel 30, having the dimensions and configuration of the land 25 on the flange, whereby when the blade and the flange are put together in concentric face to face relation the land 25 will snugly fit into the channel 30 and seat on the bottom thereof with the shoulder 24 and the periphery 20 of the flange engaging the respective inner and outer channel walls.

As shown, the inner margin 31 of the rear side of the cutter ring 28 is formed, relative to the depth of the channel 30, so that it will seat on the flange step 23 and preferably the internal diameter of the ring 28 is substantially the same as the diameter of the shoulder 22. Thus the ring margin 31 provides an annular, rearwardly projecting ridge or bead which engages the shoulder 24 of the flange land 25 and radially interlocks the entire inner periphery of the cutter ring with the flange body.

Also, as shown, the inner edge of the forward face of the cutter ring is beveled, as at 32, and the forward cutter face 34 is inwardly dished or concaved from the cutting edge 29 to the beveled corner 32. The beveled inner margin corner 32 serves as a clamping surface for securing the cutter ring, or blade onto the tool flange 14, as will hereinafter be explained and the dished or concaved forward face 34 of the blade is provided so that, in a cutting or milling operation, the only contact between the blade and the surface being shaped will be at the ring periphery or cutting edge.

In the form shown, the cutting blade or ring 28 is held against the face of the flange 14 by means of an annular clamping or retaining plate 36 which has a beveled periphery 37 of the same size as and complementary with the beveled inner edge 32 of the blade. The clamp plate 36 is preferably about the same thickness as the blade 28 adjacent its inner edge and the plate diameter is such that when the plate is seated centrally within the blade ring its outer face will be substantially flush with the forward face of the blade. The plate 36 is secured to the flange by means of suitable cap screws 38 inserted through the flange holes 16 and threaded into correspondingly spaced and suitably tapped holes 39 in the clamp plate. When these screws 38 are drawn up tight the beveled periphery 37 of the clamp plate bears firmly on the beveled inner edge 32 of the cutter blade and clamps the bead 31 against the step 23 thereby holding the cutter blade securely on the flange land 25. The depth of the recess 21 below the step 23 provides sufficient clearance for the clamp plate to be securely seated in the cutter ring, when drawn up by the screws 38, and allows for manufacturing tolerances in cutter ring thickness dimensions. Also the screws 38 are preferably made of a length such that in no event will they project through the clamp plate 36 beyond its forward face.

As shown, the flange 14 is formed with an axially concentric forwardly projecting annular boss 40 and the clamp plate 36 is formed with a central opening 42 of a size to fit over the boss 40 in snug relation whereby to precisely center the plate 36 on the axis of the shank 10, thereby, assuring precise concentricity of the cutter ring and the shank. Preferably the height of the boss 40 above the recess 21 is less than the thickness of the plate 36. Also, in the form shown, the cutter blade 28 is made so that the depth of the outer wall of the channel 30 is greater than the thickness of the flange periphery 20 whereby the conically tapered rear surface 43 of the blade will project rearwardly of the tapered rear surface 18 of the flange 14. This not only provides for unimpeded free flow of cuttings over the rear surface of the tool, but also permits repeated grinding of the blade to sharpen it without creating an outwardly facing shoulder at the flange periphery which might interfere with the cutting operation.

In operation the shank rotates at a very high speed. The cutting ring is firmly held in position on the annular flange by the clamping or retaining plate, and the smooth, toothless periphery of the carbide cutting ring slices through materials to be shaped with great ease and precision. Since the blade has a concave face and there are no projections axially beyond its forward surface or face, it is especially adapted to make cuts where it is desired to shape a surface accurately, for example, the cutting of honeycomb to various contours for an aircraft wing structure. Another feature of such high speed cutting is that there is no burning or deformation, and that no burr is left on the surfaces that are cut. In addition, due to the particular taper of the cutting ring back from the cutting periphery, the cuttings are split upwards from the surface being cut, and flow over the back of the cutting ring, always leaving the cutting periphery unimpeded.

During high speed operation, if the cutting ring should break, the radially interlocking mounting surfaces between the cutting ring and the flange will hold the pieces of the ring in position, preventing a ring explosion which could be very dangerous to personnel and equipment.

When the cutting ring becomes dull and must be sharpened, it may be easily and quickly removed from the tool for grinding by merely loosening the screws and removing the retaining plate. A replacement ring may then be installed on the tool, the retaining plate replaced, the screws tightened, and the tool is ready for use immediately. This quick change feature of the invention, achieved by the novel detachable cutting ring and its manner of mounting, greatly reduces the usual idle time for sharpening this type of tool. Having the cutting element in the form of a ring also results in a minimum cutting ring weight and size, and makes an easily handled, easily ground and sharpened, lower priced tool which reduces shop costs by reducing shop labor time for tool change and blade sharpening operations. Such form and arrangement of the cutter blade also permits ready interchange of blades made of different materials, or having different operational characteristics, on a single tool body and at the same time assures perfect operating concentricity of the blade and tool shank regardless of the blade to be used.

Although, but one specific embodiment of this invention is herein shown and described, it will be understood that details of the construction shown may be altered or omitted without departing from the spirit of the invention as defined by the following claims:

I claim:

1. A rotary cutting tool comprising a shank, an annular flange at one end of said shank concentric with and at right angles to the shank axis, a radially projecting cutting ring seating against said annular flange, and detachable means concentric with and recessed below the face of said ring for clamping said ring axially onto said flange and concentric with the axis thereof.

2. A rotary cutting tool comprising a shank, an annular flange at one end of said shank concentric with and at right angles to the shank axis, a detachable radially projecting cutting ring seating face to face against said annular flange and secured thereon by a concentric retaining plate recessed into and below the face of said ring, and means for removably securing said retaining plate on said annular flange.

3. A rotary cutting tool comprising a shank, an annular flange at one end of said shank concentric with and at right angles to the shank axis, a detachable radially extending cutting ring having a concave forward face and having its rearward face seated against said annular flange, and detachable means concentric with and recessed below the forward face of said ring for clamping said ring onto said flange concentrically with the axis thereof.

4. A rotary cutting tool as defined in claim 1, wherein the cutting ring and the annular flange have respective axially interfitting means for holding them against relative radial displacement.

5. A rotary cutting tool as defined in claim 1, wherein the cutting ring and the annular flange have respective axially interfitting means for holding them against relative radial displacement and said cutting ring has a concave forward face.

6. A rotary cutting tool comprising a shank having a concentric annular flange at one end, an annular radially extending cutting ring seated on the face of said flange opposite said shank in concentric relation therewith, said cutting ring having concentric inner and outer edges, an annular retaining member seated within said ring and peripherally overhanging the inner edge of said ring, and means for removably securing said retaining member to said flange for axially clamping said cutting ring thereto.

7. A rotary cutting tool comprising a shank having a concentric annular flange at one end, an annular radially extending cutting ring seated on the face of said flange opposite said shank in concentric relation therewith, said cutting ring having concentric inner and outer edges, an annular retaining member seated within said ring and peripherally overhanging the inner edge of said ring, means for removably securing said retaining member to said flange for axially clamping said cutting ring thereto, and annularly extending axially interfitting means on the adjacent face of said flange and cutting ring for radially interlocking said ring and flange against relative lateral displacement.

8. A rotary cutting tool comprising a shank having a concentric flange member at one end, an annular cutting ring member seated on the face of said flange member opposite said shank and in concentric relation therewith, said ring member extending radially beyong the periphery of said flange member and having concentric outer and inner edges, one of said members having an annularly extending channel in its abutting face and the other of said members having an axially projecting annularly extending formation adapted to engage in said channel to hold said members against relative lateral displacement, an annular retaining plate seated within said ring member and peripherally overhanging the inner edge thereof, and means for removably securing said plate to said flange for axially clamping said ring member thereto.

9. A rotary cutting tool comprising a shank having a concentric annular flange at one end, an annular radially extending cutting ring seated on the face of said flange opposite said shank in concentric relation therewith, said cutting ring having concentric inner and outer edges and the inner edge being beveled radially inward from the forward face of the ring, an annular retaining member seated within said ring and having a beveled peripheral edge interfittingly engaging the beveled inner edge of said ring, and means for removably securing said retaining member to said flange for axially clamping said cutting ring thereto.

10. A rotary cutting tool comprising a shank having a concentric flange member at one end, an annular cutting ring member seated on the face of said flange member opposite said shank and in concentric relation therewith, said ring member extending radially beyond the periphery of said flange member and having concentric outer and inner edges, said ring member having an annularly extending channel in its flange abutting face and said flange member having an axially projecting annularly extending land interfittingly engaged in said channel, an annular retaining member seated within said ring member and peripherally overhanging the inner edge of said ring member on the forward face side thereof and means for removably securing said retaining member to the flange member for clamping said ring member thereto.

11. A rotary cutting tool comprising a tool body having a shank and a concentric forwardly facing flange integral on one end of the shank, said flange having an axially projecting marginal land on its forward face, an annular cutting ring seated on said land and projecting radially outward therefrom, said cutting ring tapering radially outward to a cutting edge lying in a plane normal to the axis of said shank and defining the forwardmost projection of said ring axially beyond the forward face of the flange, a retaining plate seated within said ring and bearing marginally on the forward inner circumference of said ring in countersunk relation therewith, and means for removably securing said plate to said flange for clamping said ring axially against said land.

12. A rotary cutting tool comprising a tool body having a shank and a concentric forwardly facing flange integral on one end of the shank, said flange having an axially projecting marginal land on its forward face, an annular cutting ring seated on said land and projecting radially outward therefrom, said cutting ring tapering radially outward to a cutting edge lying in a plane normal to the axis of said shank and defining the forwardmost projection of said ring axially beyond the forward face of the flange, an annularly extending channel in the rearward face of said ring adapted to fit onto and receive said land, a retaining plate seated within said ring and bearing marginally on the forward inner circumference of said ring in countersunk relation therewith, and means for removably securing said plate to said flange for clamping said ring axially against said land.

13. A rotary cutting tool comprising a tool body having a shank and a concentric forwardly facing flange integral on one end of the shank, said flange having an axially projecting marginal land on its forward face, an annular cutting ring seated on said land and projecting radially outward therefrom, said cutting ring having its front face and the outer margin of its rear face inclined forwardly and converging radially outward to a cutting edge lying in a plane normal to the axis of said shank and defining the forwardmost projection of said ring axially beyond the forward face of the flange, a retaining plate seated within said ring and bearing marginally on the forward inner circumference of said ring in countersunk relation therewith, and means for removably securing said plate to said flange for clamping said ring axially against said land.

14. A rotary cutting tool comprising a tool body having a shank and a concentric forwardly facing flange integral on one end of the shank, said flange having an axially projecting marginal land on its forward face and a recessed step extending radially inward from the inner edge of said land, said step being defined by an annular concentric recess in the forward face of the flange of less diameter than the inner edge of said land, an annular cutting ring seated on said land and projecting radially outward therefrom, said cutting ring tapering radially outward to a cutting edge lying in a plane normal to the axis of said shank and defining the forwardmost projection of said ring axially beyond the forward face of the flange, an annularly extending channel in the rear face of said ring adapted to fit onto and receive said land, the inner rear margin of said ring seating on said step, a retaining plate seated within said ring and bearing marginally on the forward inner circumference of said ring in countersunk relation therewith, and means for removably securing said plate to said flange for clamping said ring axially against said land.

No references cited.